(12) United States Patent
Odaka et al.

(10) Patent No.: US 12,312,514 B2
(45) Date of Patent: May 27, 2025

(54) METHOD FOR MANUFACTURING SMART CARD

(71) Applicant: DEXERIALS CORPORATION, Shimotsuke (JP)

(72) Inventors: Ryosuke Odaka, Tochigi (JP); Morio Sekiguchi, Tochigi (JP); Hiroyuki Kumakura, Tochigi (JP); Tomoyuki Abe, Tochigi (JP)

(73) Assignee: DEXERIALS CORPORATION, Shimotsuke (JP)

( * ) Notice: Subject to any disclaimer, the term of this patent is extended or adjusted under 35 U.S.C. 154(b) by 728 days.

(21) Appl. No.: 17/623,928

(22) PCT Filed: Jun. 3, 2021

(86) PCT No.: PCT/JP2021/021183
§ 371 (c)(1),
(2) Date: Dec. 30, 2021

(87) PCT Pub. No.: WO2021/246484
PCT Pub. Date: Dec. 9, 2021

(65) Prior Publication Data
US 2022/0363953 A1 Nov. 17, 2022

(30) Foreign Application Priority Data

Jun. 5, 2020 (JP) .................................. 2020-098845
Jun. 2, 2021 (JP) .................................. 2021-093294

(51) Int. Cl.
*C09J 7/35* (2018.01)
*B29C 65/00* (2006.01)
(Continued)

(52) U.S. Cl.
CPC .............. *C09J 7/35* (2018.01); *B29C 65/4815* (2013.01); *B29C 66/45* (2013.01); *C09J 5/06* (2013.01);
(Continued)

(58) Field of Classification Search
None
See application file for complete search history.

(56) References Cited

U.S. PATENT DOCUMENTS

2003/0146266 A1* 8/2003 Chaudhuri ............. H05K 3/321
228/175
2003/0234074 A1 12/2003 Bhagwagar
(Continued)

FOREIGN PATENT DOCUMENTS

CN  1710003 A  12/2005
EP  1 333 079 A1  8/2003
(Continued)

OTHER PUBLICATIONS

KR 20100009528 (Year: 2010).*
(Continued)

*Primary Examiner* — Barbara J Musser
(74) *Attorney, Agent, or Firm* — Oliff PLC

(57) ABSTRACT

A method for manufacturing a smart card capable of achieving excellent connection reliability and bending resistance, a smart card, and a conductive particle-containing hot-melt adhesive sheet. A conductive particle-containing hot-melt adhesive sheet containing solder particles of a non-eutectic alloy in a binder containing a crystalline polyamide having a carboxyl group is interposed between a card member and an IC chip and subjected to thermocompression bonding.
(Continued)

The crystalline polyamide having a carboxyl group improves the solder wettability of the non-eutectic alloy, thereby achieving excellent connection reliability. This effect is considered to be a flux effect due to the carboxyl group present in the crystalline polyamide, and as a result, it is possible to prevent the decrease in the elastic modulus of the adhesive layer which would be caused by the addition of a flux compound and to achieve excellent bending resistance.

11 Claims, 1 Drawing Sheet

(51) Int. Cl.
- *B29C 65/48* (2006.01)
- *B29L 17/00* (2006.01)
- *C09J 5/06* (2006.01)
- *C09J 7/10* (2018.01)
- *C09J 9/02* (2006.01)
- *G06K 19/077* (2006.01)

(52) U.S. Cl.
CPC . *C09J 7/10* (2018.01); *C09J 9/02* (2013.01); *G06K 19/07722* (2013.01); *B29L 2017/006* (2013.01); *C09J 2203/326* (2013.01); *C09J 2301/304* (2020.08); *C09J 2301/408* (2020.08); *C09J 2467/00* (2013.01); *C09J 2477/00* (2013.01)

(56) References Cited

U.S. PATENT DOCUMENTS

| | | | |
|---|---|---|---|
| 2005/0282002 A1* | 12/2005 | Husemann | C09J 5/06 428/328 |
| 2020/0010740 A1 | 1/2020 | Lee | |

FOREIGN PATENT DOCUMENTS

| | | | | |
|---|---|---|---|---|
| EP | 1 607 457 A2 | 12/2005 | | |
| JP | 2005-081404 A | 3/2005 | | |
| JP | 2011-233550 A | 11/2011 | | |
| JP | 5964187 B2 | 8/2016 | | |
| JP | 2017-117468 A | 6/2017 | | |
| JP | 2020-077870 A | 5/2020 | | |
| JP | 2021-193175 A | 12/2021 | | |
| WO | WO-2020240252 A1 * | 12/2020 | ....... | G06K 19/07718 |
| WO | 2021/246483 A1 | 12/2021 | | |

OTHER PUBLICATIONS

Aug. 10, 2021 International Search Report issued in International Patent Application No. PCT/JP2021/021183.
Apr. 12, 2021 Office Action issued in Japanese Patent Application No. 2021-005393.
Aug. 4, 2022 Extended Search Report issued in European Patent Application No. 21818514.8.
Apr. 26, 2023 Office Action Issued in Chinese Patent Application No. 202180003451.9.
Feb. 28, 2024 Office Action Issued in Korean Patent Application No. 10-2021-7037763.
Dec. 21, 2023 Office Action issued in Chinese Patent Application No. 202180003451.9.

* cited by examiner

METHOD FOR MANUFACTURING SMART CARD

TECHNICAL FIELD

This technology relates to a method for manufacturing a smart card using a conductive particle-containing hot-melt adhesive sheet, and the smart card. This application claims priority based on Japanese Patent Application No. 2020-098845 filed on Jun. 5, 2020, in Japan and Japanese Patent Application No. 2021-093294 filed on Jun. 2, 2021, in Japan, which are incorporated herein by reference.

BACKGROUND ART

In recent years, smart cards mounted with IC chips have become popular. As an example of a method for mounting an IC chip on a smart card, there have been known to use an anisotropic conductive film in which conductive particles are blended in a binder containing a crystalline resin (see, for example, Patent Document 1). As disclosed in Patent Document 1, a connection material such as an anisotropic conductive film (ACF) or an anisotropic conductive paste (ACP) may be used for a smart card mounted with an IC chip (see, for example, Patent Document 2).

However, since the electrical conduction in these technologies rely on the contact of the conductive particles, when the smart card is put into a reliability test such as a high temperature and high humidity test, the conduction is sometimes lost due to the expansion of the resin.

CITATION LIST

Patent Literature

Patent Document 1: Japanese Unexamined Patent Application Publication No. 2017-117468
Patent Document 2: Japanese Patent No. 5964187

SUMMARY OF INVENTION

Technical Problem

The present technology has been proposed in view of such conventional circumstances, and provides a method for manufacturing a smart card capable of achieving excellent connection reliability and bending resistance, a smart card, and a conductive particle-containing hot-melt adhesive sheet.

Solution to Problem

A method for manufacturing a smart card according to the present technology includes the step of thermocompression bonding a card member and an IC chip with a conductive particle-containing hot-melt adhesive sheet interposed therebetween, the conductive particle-containing hot-melt adhesive sheet containing solder particles of a non-eutectic alloy in a binder containing a crystalline polyamide having a carboxyl group.

A smart card according to the present technology includes: a card member, an IC chip, and an adhesive layer for bonding the card member and the IC chip; wherein the adhesive layer contains solder particles of a non-eutectic alloy in a binder containing a crystalline polyamide having a carboxyl group.

A conductive particle-containing hot-melt adhesive sheet according to the present technology contains solder particles of a non-eutectic alloy in a binder containing a crystalline polyamide having a carboxyl group.

Advantageous Effects of Invention

The present technology can improve the solder wettability of the non-eutectic alloy by the crystalline polyamide having a carboxyl group and can achieve excellent connection reliability and bending resistance.

DESCRIPTION OF EMBODIMENTS

Embodiments of the present technology will be described in detail below in the following order with reference to the drawings.
1. Smart card
2. Method for manufacturing smart card
3. Conductive particle-containing hot-melt adhesive sheet
4. First examples
5. Second examples 1. Smart Card A smart card according to the present embodiment includes a card member, an IC chip, and an adhesive layer for bonding the card member and the IC chip, wherein the adhesive layer contains solder particles of a non-eutectic alloy in a binder containing a crystalline polyamide having a carboxyl group. Since the adhesive layer contains solder particles of a non-eutectic alloy in a binder containing a crystalline polyamide having a carboxyl group, it is possible to improve solder wettability and to achieve excellent connection reliability and bending resistance.

As used herein, the smart card is a card incorporating an integrated circuit (IC) for recording and calculating information (data), and is also referred to as an "integrated circuit card" or a "chip card". The smart card may be a dual interface card having two interfaces of a contact type and a non-contact type in one IC chip, or a hybrid card mounted with the contact type IC chip and the non-contact type IC chip. In addition, the smart card may be a fingerprint authentication card having a fingerprint authentication element or a card having a one-time password function incorporating a battery element and a display element. These IC chips and elements are provided with pads, and are electrically connected to portions functioning as electrodes on the card member side.

Figure 1:
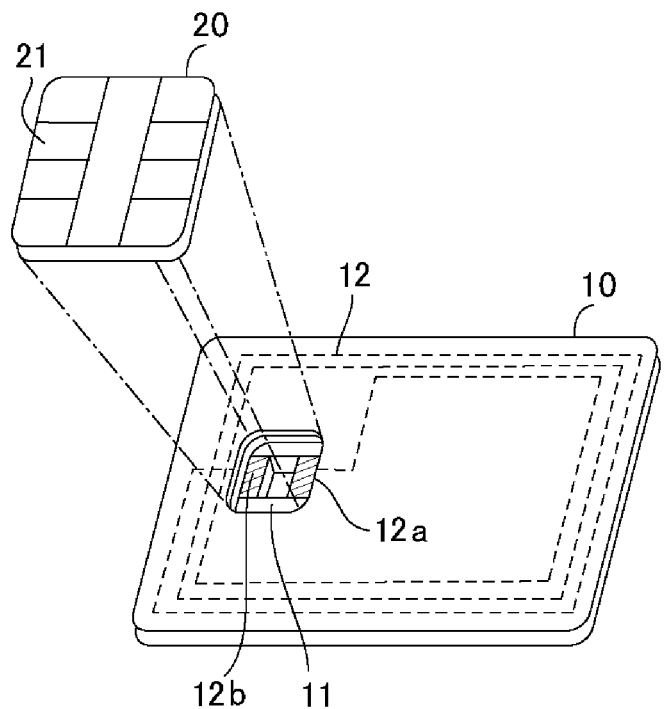
FIG. 1 is a schematic perspective view illustrating an example of a smart card.
Figure 2:
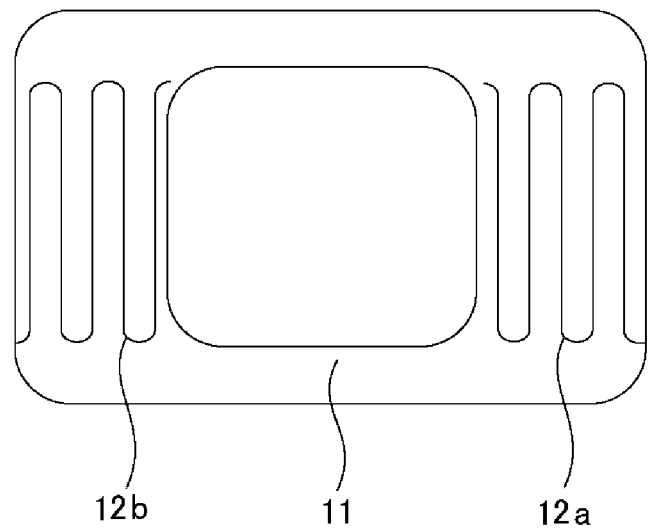
FIG. 2 is a top view illustrating an example of an IC chip region of a card member.

FIG. 1 is a schematic perspective view illustrating an example of a smart card, and FIG. 2 is a top view illustrating an example of an IC chip region of a card member. The smart card includes a card member 10 and an IC chip 20. The card member 10 is a laminate in which a first base material, a second base material having an antenna, and a third base material are laminated in this order. The IC chip 20 has a plurality of contact terminals 21 on its front surface and electrodes on its rear surface, for example, on the entire surface.

The first base material, the second base material, and the third base material are constituted by laminating a plurality of layers made of resin, for example. The resins that constitute each layer include, for example, PVC (polyvinyl chloride) including recycled material, PET (polyethylene terephthalate), PET-G, PC (polycarbonate), environmentally friendly biodegradable plastics (e.g., PLA (polylactic acid)), and base materials made of plastic waste collected before it enters the sea, referred to as ocean plastic. By constituting the base material with a plurality of layers, it is possible to prevent the rigidity of the base material from being excessively increased as compared with the case of constituting the base material with one layer.

The first base material has an opening 11 corresponding to the shape of the IC chip 20, and the opening 11 exposes the second base material to form an IC chip region. The second base material is arranged between the first base material and the third base material, and has an antenna pattern 12 which circulates outer peripheral a plurality of times inside a layer made of resin, for example. In the IC chip area facing the opening 11, a part of the second base material corresponding to the rear surface of the IC chip 20 is removed to form a recess, thereby exposing a part of the buried antenna pattern. In other words, the recess formed in the second base material corresponds to the shape of the opening 11, and a first exposed portion 12a and a second exposed portion 12b of the antenna pattern 12 are formed in the IC chip region. The antenna pattern 12 may be made of a metal wire such as a copper wire.

The second base material preferably has a groove which is a non-through hole or a plurality of holes in the region of the IC chip. Thus, the resin of the adhesive layer flows into the grooves or holes, and the adhesion with the adhesive layer can be improved. Further, the shortest length of the opening of the grooves or holes is preferably smaller than the average particle diameter of the solder particles. The specific shortest length of the opening of the grooves or holes is preferably 20% or more, more preferably 30% or more, and particularly preferably 40% or more of the average particle diameter of the solder particles. The specific upper limit of the shortest length of the opening of the grooves or holes is preferably 80% or less, more preferably 70% or less, and particularly preferably 60% or less of the average particle diameter of the solder particles. As a result, the solder particles easily fit into the grooves or holes, thereby improving trapping efficiency of the solder particles and achieving an excellent electrical connection with the IC chip.

The adhesive layer is interposed between the IC chip region of the opening 11 and the IC chip 20, and electrically connects the IC chip 20 to the first exposed portion 12a and the second exposed portion 12b of the antenna pattern 12.

Since the smart card according to the present embodiment is provided with an adhesive layer containing solder particles of a non-eutectic alloy in a binder containing a crystalline polyamide having a carboxyl group, it is possible to improve solder wettability and to achieve excellent connection reliability. This effect is considered to be a flux effect due to the carboxyl group present in the crystalline polyamide, and as a result, it is possible to prevent the decrease in the elastic modulus of the adhesive layer which would be caused by the addition of a flux compound and to achieve excellent bending resistance. Further, since the solder particles of a non-eutectic alloy stays in a semi-molten state for a longer time during thermocompression bonding as compared with the solder particles of an eutectic alloy, it is possible to remove the resin sufficiently and to achieve excellent connection reliability. Further, in the smart card according to the present embodiment, since the circuit (conducting portion) of the IC chip and the circuit (conducting portion) of the antenna pattern are metal-bonded by melting of solder particles, it is possible to suppress the swelling of the binder caused by moisture absorption in a wet heat test and to achieve excellent connection reliability. The present technology can also be applied to generally used anisotropic connection bodies. The present technology can also be applied to a method for manufacturing a connected body in substantially the same manner.

2. Method for Manufacturing Smart Card

A method for manufacturing a smart card according to the present embodiment includes the step of thermocompression bonding a card member and an IC chip with a conductive particle-containing hot-melt adhesive sheet interposed therebetween, in which the conductive particle-containing hot-melt adhesive sheet contains solder particles of a non-eutectic alloy in a binder containing a crystalline polyamide having a carboxyl group. Thus, it is possible to improve solder wettability and to achieve excellent connection reliability.

Hereinafter, with reference to FIGS. 1 and 2, a pasting step (A) of pasting a conductive particle-containing hot-melt adhesive sheet to the connection surface of an IC chip, a placing step (B) of placing the IC chip on the IC chip region of a card member, and a pressure bonding step (C) of thermocompression bonding the IC chip and the card member will be described.

Pasting Step (A)

In the pasting step (A), a conductive particle-containing hot-melt adhesive sheet is pasted to the connection surface (rear surface) of the IC chip 20. The pasting step (A) may be a laminating step of laminating the conductive particle-containing hot-melt adhesive sheet on the connection surface of the IC chip 20, or a temporary pasting step of pasting the conductive particle-containing hot-melt adhesive sheet onto the connection surface of the IC chip 20 at a low temperature.

When the pasting step (A) is a laminating step, a pressurizing laminator or a vacuum pressurizing laminator may be used. By employing the laminating step as the pasting step (A), it is possible to mount a relatively large area in a batch as compared with the temporary pasting step. On the other hand, employing a temporary pasting step as the pasting step (A) has an economical advantage since it requires only a minimum change such as installation or change of a tool from a conventional device.

In the pasting step (A), the temperature reaching the conductive particle-containing hot-melt adhesive sheet is preferably equal to or higher than the temperature at which the binder flows and lower than the temperature at which the solder melts. Here, the temperature at which the binder flows may be a temperature at which the melt viscosity of the conductive particle-containing hot-melt adhesive sheet becomes 100 to 1,000,000 Pa*s, preferably 1,000 to 100,000 Pa*s. Thus, the conductive particle-containing hot-melt adhesive sheet can be pasted to the connection surface of the IC chip 20 while maintaining the shape of the solder particles. The melt viscosity of the conductive particle-containing hot-melt adhesive sheet can be measured by using, for example, a rotary rheometer (available from TA Instrument) under the conditions of measurement pressure of 5 g, temperature range of 30 to 200° C., temperature rising speed of 10° C./minute, measurement frequency of 10 Hz, measurement plate diameter of 8 mm, and load variation with respect to the measurement plate of 5 g.

Placing Step (B)

In the placing step (B), the IC chip 20 is picked up by using, for example, a tool having an adsorption mechanism, the IC chip region of the card member 10 is aligned with the IC chip 20, and the IC chip 20 is placed via the conductive particle-containing hot-melt adhesive sheet.

Pressure Bonding Step (C)

In the pressure bonding step (C), the IC chip 20 and the card member 10 are thermocompression bonded by using a pressure bonding device. In the pressure bonding step (C), the number of times of thermocompression bonding may be set according to the object to be connected, or may be one time, but it is preferable to perform thermocompression bonding a plurality of times. Thus, the binder of the conductive particle-containing hot-melt adhesive sheet is sufficiently removed, so that the IC chip 20 can be metal-bonded to the first exposed portion 12a and the second exposed portion 12b of the antenna pattern 12 by melting the solder particles.

The thermocompression bonding temperature in the pressure bonding step (C) is preferably set such that the temperature reaching the conductive particle-containing hot-melt adhesive sheet is equal to or higher than the melting point of the solder particles. Here, the melting point refers to the solidus temperature. In other words, the thermocompression bonding temperature in the pressure bonding step (C) is preferably set such that the temperature reaching the conductive particle-containing hot-melt adhesive sheet is equal to or higher than the solidus temperature of the solder particles. Here, the solidus line is a curve showing the relation between the temperature (melting point) of the liquid phase in equilibrium with the solid phase and the composition of the solid phase. The temperature reaching the specific conductive particle-containing hot-melt adhesive sheet is preferably 120 to 160° C., more preferably 120 to 155° C., and still more preferably 120 to 150° C. Thus, it is possible to suppress the thermal shock of the card member 10 and the IC chip 20, thereby preventing the deformation of the card member 10.

Since the method for manufacturing a smart card according to the present embodiment uses a conductive particle-containing hot-melt adhesive sheet containing solder particles of a non-eutectic alloy in a binder containing a crystalline polyamide having a carboxyl group, it is possible to improve solder wettability and to achieve excellent connection reliability. This effect is considered to be a flux effect due to the carboxyl group present in the crystalline polyamide, and as a result, it is possible to prevent the decrease in the elastic modulus of the adhesive layer which would be caused by the addition of a flux compound and to achieve excellent bending resistance. Further, since the solder particles of a non-eutectic alloy stays in a semi-molten state for a longer time during thermocompression bonding as compared with the solder particles of an eutectic alloy, it is possible to remove the resin sufficiently and to achieve excellent connection reliability. Further, in the method for manufacturing a smart card according to the present embodiment, since the conducting portion of the IC chip and the conducting portion of the antenna pattern are metal-bonded by melting of solder particles, it is possible to suppress the swelling of the binder caused by moisture absorption in a wet heat test and to achieve excellent connection reliability.

3. Conductive Particle-Containing Hot-Melt Adhesive Sheet

A conductive particle-containing hot-melt adhesive sheet according to the present embodiment contains solder particles of a non-eutectic alloy in a binder containing a crystalline polyamide having a carboxyl group. Thus, it is possible to improve solder wettability and to achieve excellent connection reliability.

The lower limit of the thickness of the conductive particle-containing hot-melt adhesive sheet is preferably 10 μm or more, more preferably 20 μm or more, and still more preferably 30 μm or more. The upper limit of the thickness of the conductive particle-containing hot-melt adhesive sheet is preferably 100 μm or less, more preferably 80 μm or less, and still more preferably 60 μm or less. Thus, the sheet can be suitably used for thermocompression bonding an IC chip to a card member to manufacture a smart card.

Binder

The binder contains at least a crystalline polyamide having a carboxyl group. The crystalline resin can be confirmed, for example, by observing an endothermic peak in a temperature rising process in differential scanning calorimetry.

The terminal carboxyl group concentration of the crystalline polyamide is preferably 0.5 mgKOH/g or more, more preferably 1.0 mgKOH/g or more, and still more preferably 2.0 mgKOH/g or more. The terminal carboxyl group concentration of the crystalline polyamide may be 50 mgKOH/g or less, 30 mgKOH/g or less, or 10 mgKOH/g or less. The terminal carboxyl group concentration of the crystalline polyamide can be evaluated in accordance with, for example, JIS K0070-1992 or ISO 2114. Specific examples of commercially available crystalline polyamide having a carboxyl group include, for example, "HX2519" and "M1276" available from ARKEMA.

The crystalline polyamide having a carboxyl group is preferably a copolymer based on lauryl lactam (PA 12: polyamide 12 or nylon 21) or 11-aminoundecanoic acid (PA 11: polyamide 11) as a monomer. Such copolymers have higher crystallinity, higher melt viscosity, and higher rigidity as compared with polyamides based on dimer acid, thereby achieving excellent connection reliability and bending resistance.

The lower limit of the melting point of the crystalline polyamide having a carboxyl group is preferably 70° C. or more, more preferably 80° C. or more, and still more preferably 90° C. or more. The upper limit of the melting point of the crystalline polyamide having a carboxyl group is preferably 150° C. or less, more preferably 140° C. or less, and still more preferably 130° C. or less. If the melting point of the crystalline polyamide having a carboxyl group is too high, the viscosity of the binder does not decrease sufficiently, and the removal of the resin becomes insufficient, so that the conductive property tends to deteriorate. If the melting point of the crystalline polyamide having a carboxyl group is too low, the hardness at the time of press-out tends to be insufficient. The melting point can be measured, for example, by differential scanning calorimetry (DSC).

The lower limit of the weight average molecular weight of the crystalline polyamide having a carboxyl group is preferably 5,000 or more, more preferably 8,000 or more, still more preferably 10,000 or more, and most preferably 10,000 or more. The upper limit of the weight-average molecular weight of the crystalline polyamide having a carboxyl group is preferably 100,000 or less, more preferably 50,000 or less, and still more preferably 30,000 or less. If the weight-average molecular weight of the crystalline polyamide having a carboxyl group is too small, the curing of the binder becomes insufficient, resulting in a disadvantage such as an increase in resistance in a bending test. The weight average molecular weight Mw can be, for example, a value in terms of standard polystyrene molecular weight measured by gel permeation chromatography (GPC).

The melt volume flow rate (MVR) of crystalline polyamide having a carboxyl group measured at a temperature of 160° C. and a load of 2.16 kg is preferably 2 to 50 cm³/10 min, more preferably 3 to 30 cm³/10 min, and still more preferably 5 to 10 cm³/10 min. If the melt volume flow rate is too large, the hardness at the time of press out becomes insufficient, and the bending characteristic tends to be degraded. The melt volume flow rate can be measured according to the specification of the calculation method of the melt flow rate of thermoplastic plastics in JIS K7210: 1999.

The binder containing at least a crystalline polyamide having a carboxyl group can improve solder wettability and achieve excellent connection reliability. This effect is considered to be a flux effect due to the carboxyl group present in the crystalline polyamide, and as a result, it is possible to prevent the decrease in the elastic modulus of the adhesive layer which would be caused by the addition of a flux compound and to achieve excellent bending resistance.

The binder may contain other components as required. As the other components, a crystalline resin, an amorphous resin or the like can be appropriately selected according to the purpose. The crystalline resin is not particularly limited as long as it is a resin having a crystalline region, and examples thereof include polyester resin, polyolefin resin, and polyurethane resin, among other resins. Examples of the polyester resin include polyethylene terephthalate resin and polybutylene terephthalate resin, and examples of the polyolefin resin include polyethylene resin, polypropylene resin, and polybutylene resin. Examples of the amorphous resin include those similar to those illustrated in the description of the crystalline resin. Among these, crystalline polyester resin is preferably contained as another component from the viewpoint of adhesion at a low temperature and in a short time.

The proportion of the crystalline polyamide having a carboxyl group in the binder is preferably 10 to 100 wt %, more preferably 30 to 100 wt %, and still more preferably 50 to 100 wt %. Thus, even in a pressure bonding at a low temperature of 160° C. or less, the flux effect can be exhibited, so that it is possible to improve solder wettability and to achieve excellent connection reliability and bending resistance. In the case of a pressure-bonding in a short time at a low temperature, such as for card application, the proportion of the crystalline polyamide having a carboxyl group in the binder of 10 wt % or less is difficult to achieve a sufficient flux effect.

The binder preferably has a melt volume flow rate (MVR) similar to that of the crystalline polyamide having a carboxyl group measured at a temperature of 160° C. and a load of 2.16 kg. That is, the melt volume flow rate (MVR) is preferably 2 to 50 cm³/10 min, more preferably 3 to 30 cm³/10 min, and still more preferably 5 to 10 cm³/10 min. If the melt volume flow rate is too large, the hardness at the time of press-out tends to be insufficient, and the bending characteristic tends to be degraded.

Solder Particles

The solder particles are not particularly limited as long as a non-eutectic alloy is employed, and are preferably an alloy containing two or more metals selected from the group consisting of Sn, Bi, Ag, In, Cu, Sb, Pb, and Zn. As the solder particles, for example, the solder particles may be appropriately selected from Sn—Pb, Pb—Sn—Sb, Sn—Sb, Sn—Pb—Bi, Bi—Sn, Sn—Bi—Cu, Sn—Cu, Sn—Pb—Cu, Sn—In, Sn—Ag, Sn—Pb—Ag, and Pb—Ag based particles specified in JIS Z 3282-2017 (corresponding international standards: ISO 9453:2014) according to the terminal material, connection conditions, and the like. Since the solder particles of the non-eutectic alloy stays in a semi-molten state for a longer time during thermocompression bonding as compared with the solder particles of the eutectic alloy, it is possible to remove the resin sufficiently and to achieve excellent connection reliability. In this specification, the term "non-eutectic alloy" refers to an alloy having no eutectic point.

The lower limit of the solidus temperature (melting point) of the solder particles is preferably 120° C. or more, more preferably 130° C. or more, and still more preferably 135° C. or more. The upper limit of the liquidus temperature of the solder particles may be 210° C. or less, preferably 200° C. or less, more preferably 195° C. or less, and still more preferably 190° C. or less. Here, the liquidus line is a curve showing the relation between the temperature (melting point) of the liquid phase in equilibrium with the solid phase and the composition of the liquid phase. The upper limit of the solidus temperature of the solder particles may be 155° C. or less, preferably 150° C. or less, more preferably 145° C. or less, and still more preferably 140° C. or less. The solder particles may have a flux compound directly bonded to the surface for the purpose of activating the surface. The activated surface will promote metal bonding with a metal wire or an electrode.

The solder particles preferably have a solidus temperature (melting point) of 155° C. or less, preferably 150° C. or less, and are made of one or more alloys selected from the group consisting of an Sn—Bi—Cu alloy, an Sn—Bi—Ag alloy, an Sn—Bi alloy, an Sn—Pb—Bi alloy, and an Sn—In alloy. Specific examples of the solder particles include Sn30Bi0.5Cu, Sn30Bi, Sn40Bi, Sn50Bi, Sn58Bi, Sn40Bi0.1Cu, Sn43Pb14Bi, and Sn20In. Thus, it is possible to achieve excellent connection reliability.

The lower limit of the mass ratio range of the blending amount of the solder particles with respect to 100 parts by mass of the binder is preferably 20 parts by mass or more, more preferably 40 parts by mass or more, and more preferably 80 parts by mass or more, and the upper limit of the mass ratio range of the blending amount of the solder particles with respect to 100 parts by weight of the binder is preferably 500 parts by mass or less, more preferably 400 parts by mass or less, and more preferably 300 parts by mass or less.

Insufficient blending amount of the solder particles will degrade the conductivity, and excessive blending amount of the solder particles will make adhesive force insufficient and tend to degrade the insulation property in the IC chip, thereby making it difficult to achieve excellent conductivity reliability. When the solder particles are present in the binder, the blending ratio may be a volume ratio, and when the conductive particle-containing hot-melt adhesive sheet is manufactured (before the solder particles are present in the binder), the blending ratio may be a mass ratio. The mass ratio can be converted into a volume ratio from the specific gravity of the material to be blended, the blending ratio, and the like.

The solder particles may be kneaded and dispersed in the resin of the conductive particle-containing hot-melt adhesive sheet, or may be arranged in a separated state. This arrangement may have a certain regular pattern. Examples of the regular arrangement include a square lattice, a hexagonal lattice, an orthorhombic lattice, and a long lattice, among other arrangements. In addition, the solder particles may be arranged as aggregates in which a plurality of solder particles are aggregated. In this case, the arrangement of the aggregates in a plan view of the conductive particle-containing hot-melt adhesive sheet may be regular arrangement or random arrangement as with the arrangement of the solder particles described above.

The average particle diameter of the solder particles is preferably 70% or more, more preferably 80% or more, and still more preferably 95% or more of the thickness of the conductive particle-containing hot-melt adhesive sheet. Thus, the solder particles can be easily sandwiched between the conducting portion of the IC chip and the conducting portion of the card member at the time of thermocompression bonding, so that the solder particles can be metal-bonded.

The lower limit of the average particle diameter of the solder particles is preferably 10 µm or more, more preferably 15 µm or more, and still more preferably 20 µm or more. The upper limit of the average particle diameter of the solder particles is preferably 50 µm or less, more preferably 45 µm or less, and still more preferably 40 µm or less. The maximum diameter of the solder particles may be 200% or less of the average particle diameter, preferably 150% or less of the average particle diameter, and more preferably 120% or less of the average particle diameter. With the maximum diameter of the solder particles within the above range, it is possible to sandwich the solder particles between the conducting portion of the IC chip and the conducting portion of the card member, and to metal-bond the conducting portions by melting the solder particles.

The solder particles may form an aggregate composed of a plurality of particles. In the case of a plurality of solder particles are aggregated, the size of the aggregate may be made equal to the average particle diameter of the aforementioned solder particles. The size of the aggregate can be determined by observation with an electron microscope or an optical microscope.

Here, the average particle diameter is the average value of the major axis diameter of the particles measured, for example, at N=20 or more, preferably at N=50 or more, and more preferably at N=200 or more in an observation image by using a metal microscope, an optical microscope, an SEM (Scanning Electron Microscope), or the like, and is the average value of the diameter of the particles when the particles are spherical. In addition, the value may be a measured value measured by using known image analysis software ("WinROOF" available from MITANI CORPORATION, "A-zo-kun (registered trademark)" available from Asahi Kasei Engineering Corporation) or a measured value (N=1,000 or more) measured by using an image type particle diameter distribution measuring device (for example, FPIA-3000 (Malvern)). The average particle diameter obtained from the observation image or measured by the image type particle diameter distribution measuring device can be used as the average value of the maximum length of particles. In manufacturing of a conductive particle-containing hot-melt adhesive sheet, it is possible to simply use manufacturer values such as a particle diameter (D 50) at which the accumulated value in the particle diameter distribution obtained by the laser diffraction/scattering method reaches 50%, or an arithmetic average diameter (preferably on a volume basis), among other values.

Other Additives

In addition to the binder and solder particles described above, a variety of additives can be added to the conductive particle-containing hot-melt adhesive sheet without impairing the effects of the present technology. For example, silica of nano-size (primary particle diameter of 1 nm or more and less than 1,000 nm) may be dispersed in order to improve gas barrier properties and elasticity. Furthermore, in order to control the height of the solder particles to be constant after the pressure bonding, resin particles, rubber particles, silicone rubber particles, silica or the like having a prescribed size may be dispersed as spacer particles. In addition, a thermosetting resin or a curing agent may be added within a range not impairing the effect of the present technology.

Since the conductive particle-containing hot-melt adhesive sheet according to the present embodiment contains solder particles of a non-eutectic alloy in a binder containing a crystalline polyamide having a carboxyl group, it is possible to improve solder wettability and to achieve excellent connection reliability and bending resistance. This effect is considered to be a flux effect due to the carboxyl group present in the crystalline polyamide, and as a result, it is possible to prevent the decrease in the elastic modulus of the adhesive layer which would be caused by the addition of a flux compound and to achieve excellent bending resistance. Further, since the solder particles of a non-eutectic alloy stays in a semi-molten state for a longer time during thermocompression bonding as compared with the solder particles of an eutectic alloy, it is possible to remove the resin sufficiently and to achieve excellent connection reliability. Further, in the conductive particle-containing hot-melt adhesive sheet according to the present embodiment, since the conducting portion of the IC chip and the conducting portion of the antenna pattern are metal-bonded by melting of solder particles, it is possible to suppress the swelling of the binder caused by moisture absorption in a wet heat test and to achieve excellent connection reliability. It should be noted that the sheet can be used for applications other than smart cards, and the sheet can be used as an anisotropic conductive film.

Method for Manufacturing Conductive Particle-Containing Hot-Melt Adhesive Sheet

The method for manufacturing a conductive particle-containing hot-melt adhesive sheet includes: a varnish preparation step of dissolving each resin component of a binder in a solvent to prepare varnish; a conductive particle-containing resin composition preparation step of adding solder particles to prepare a conductive particle-containing resin composition; and a drying step of applying the conductive particle-containing resin composition on a releasable base material to have a predetermined thickness and drying it. In the case where the solder particles in the conductive particle-containing hot-melt adhesive sheet are spaced apart from each other or are regularly arranged, the sheet may be provided without adding the solder particles, and the solder particles may be separately arranged by a known method.

The solvent to be used for each resin component is not particularly limited and can be appropriately selected according to the purpose, for example, a mixed solvent of 50:40:10 (mass ratio) of methyl ethyl ketone:toluene:cyclohexanone or a mixed solvent of 50:50 (mass ratio) of toluene:ethyl acetate can be used.

The releasable base material includes, for example, a base material having a contact angle with water of 80° or more, and specific examples of the releasable base material include a silicone film, a fluorine film, a silicone film, and PET, PEN, or glassine paper treated with a release agent such as fluorine. The thickness of the releasable base material is not particularly limited and can be appropriately selected according to the purpose, but it is preferably 20 to 120 µm.

The conductive particle-containing hot-melt adhesive sheet may be supplied as a film wound body formed into a tape shape and wound around a core. The diameter of the winding core is not particularly limited, and may be appropriately selected according to the purpose, but is preferably 50 to 1,000 mm. In addition, although the length of the film is not particularly limited, a film length of 5 m or more will allow a trial manufacture by using a manufacturing apparatus, and a film length of 1,000 m or less will be suitable in view of workability and handleability.

EXAMPLES

4. First Examples

In the present examples, conductive particle-containing hot-melt adhesive sheets containing solder particles were prepared, and smart cards were manufactured by using the hot-melt adhesive sheets. Then, with respect to each of the smart cards, the solder wettability, the bending test result, and the connection reliability were evaluated. The present embodiment is not limited to these examples.
Preparation of Solder Particles The metal material was placed in a heated vessel at a predetermined blending ratio and cooled after melting to obtain a solder alloy. Powder was prepared from the solder alloy by the atomizing method and classified so that the particle diameter was in the range of 20 to 38 μm to obtain solder particles having the following composition.

Type 4 Sn-40 Bi (non-eutectic, solidus temperature: 139° C., liquidus temperature: 167° C.)

Type 4 Sn-58 Bi (eutectic, solidus temperature and liquidus temperature: 138° C.)
Preparation of Conductive Particle-Containing Hot-Melt Adhesive Sheet The following resins were prepared.

PES 111 EE (crystalline polyester available from Toagosei): solubilized at Solid Content/Cyclohexanone=25/75

HX2519 (a crystalline polyamide having a carboxyl group, available from ARKEMA, terminal carboxyl group concentration of 6.56 mg KOH/g, melting point of 109° C., MVR of 8 cm$^3$/10 min, weight average molecular weight of 12,000)

UE3500 (amorphous polyester resin available from UNITIKA)

N-5196 (polycarbonate-based polyurethane elastomer available from Nippon Polyurethane Industry)

As shown in Table 1, the above resins were mixed and stirred so that the solid content of the resins had a predetermined blending amount (parts by mass) to prepare a mixed varnish. Subsequently, 45 parts by mass of conductive particles were added to 100 parts by mass of the solid content of the mixed varnish to prepare a resin composition containing conductive particles. The prepared conductive particle-containing resin composition was coated on a PET film having a thickness of 50 μm so as to have an average thickness of 40 μm after drying, and dried at 70° C. for 5 minutes, and then at 120° C. for 5 minutes to prepare a conductive particle-containing hot-melt adhesive sheet.
Manufacture of Smart Card A laminate in which a first base material, a second base material having an antenna, and a third base material are laminated was prepared as a card member. In the IC chip region of the card member, a Cu wire is exposed from PVC as a base material. In addition, a test chip module (12 mm×13 mm, gold plated) was prepared as the IC chip.

A conductive particle-containing hot-melt adhesive sheet was laminated on the connection surface of the chip module under a condition of 3 bar. Then, the chip module to which the conductive particle-containing hot-melt adhesive sheet was pasted was placed on the IC chip region of the card member, and thermocompression bonding was performed 3 times under the conditions of 215 to 230° C., 1.0 sec, and 2.5 bar to prepare a smart card. The temperature reaching the conductive particle-containing hot-melt adhesive sheet under the above thermocompression bonding conditions was about 150 to 165° C.
Evaluation of Solder Wettability The chip module was detached from the smart card and the resin adhering to the chip module and the Cu wire was removed by using acetone. Then, it was observed whether solder adhered on the gold plating of the chip module and the Cu wire. The cases in which solder was adhered were evaluated as "GOOD", and the cases in which solder was not adhered were evaluated as "BAD".
Evaluation of Bending Test Result In accordance with ISO 10373-1 5.8, a bending force was applied periodically to the smart card at the defined strength and direction. Then the Q value of the smart card after the bending test of 4,000 cycles was measured by a resonance frequency checker MP300CL3 (available from Micropross). The cases in which the Q value decreased by 50% or more were evaluated as "BAD", and the other cases were evaluated as "GOOD".
Evaluation of Connection Reliability The Q value of the smart card was measured by a resonance frequency checker MP300CL3 (available from Micropross) after a high-temperature and high-humidity test in accordance with ISO 24789-2 (at 50° C. under 93% RH for 72 hours). The cases in which the Q value decreased by 50% or more were evaluated as "BAD", and the other cases were evaluated as "GOOD".

Table 1 shows the blending of the conductive particle-containing hot-melt adhesive sheet of Examples 1 to 2 and Comparative Examples 1 to 3, evaluation of the solder wettability, evaluation of the bending test result, and evaluation of the connection reliability of the smart card.

TABLE 1

|  | Ex. 1 | Ex. 2 | Comp. 1 | Comp. 2 | Comp. 3 |
| --- | --- | --- | --- | --- | --- |
| crystalline polyester PES-111EE | — | 100 | 100 | 25 | 25 |
| crystalline polyamide HX 2519 | 200 | 100 | 100 | — | — |
| amorphous polyester UE3500 | — | — | — | 75 | 75 |
| elastomer N-5196 | — | — | — | 97 | 100 |
| organic acid glutaric acid | — | — | — | 3 | — |
| Sn40Bi (non-eutectic) | 90 | 90 | — | 90 | 90 |
| Sn58Bi (eutectic) | — | — | 90 | — | — |
| solder wettability evaluation, chip electrode side | GOOD | GOOD | GOOD | GOOD | GOOD |
| solder wettability evaluation, Cu wire side | GOOD | GOOD | BAD | GOOD | BAD |
| bending test result evaluation | GOOD | GOOD | BAD | BAD | BAD |
| connection reliability evaluation | GOOD | GOOD | BAD | GOOD | BAD |

In Comparative Example 1, since solder particles of an eutectic alloy are used, it was not possible to achieve excellent connection reliability. It is considered that this is because the solder particles reach the eutectic point and liquefy during thermocompression bonding, and the resin cannot be sufficiently removed. In Comparative Example 2, since a flux compound is used without using a crystalline polyamide having a carboxyl group, the elastic modulus of the adhesive layer was decreased, so that it was not possible bending test result, and the evaluation of the connection reliability of the smart card. In Reference Example 1, a chip module to which a conductive particle-containing hot-melt adhesive sheet was pasted was placed on the IC chip region of the card member, and the smart card was manufactured by using a reflow furnace. In the reflow temperature profile, the peak temperature was set so that the temperature reaching the conductive particle-containing hot-melt adhesive sheet was about 150° C.

TABLE 2

|  | EX. 1 | Ex. 2 | Ex. 3 | Comp. 1 | Comp. 2 | Comp. 3 | Comp. 4 | Comp. 5 | Ref. 1 |
|---|---|---|---|---|---|---|---|---|---|
| crystalline polyester PES-111EE | — | 100 | 100 | 100 | 25 | 25 | 100 | 100 | — |
| crystalline polyamide HX 2519 | 200 | 100 | 100 | 100 | — | — | 100 | 100 | 200 |
| amorphous polyester UE3500 | — | — | — | — | 75 | 75 | — | — | — |
| elastomer N-5196 | — | — | — | — | 97 | 100 | — | — | — |
| organic acid glutaric acid | — | — | — | — | 3 | — | — | — | — |
| Sn17Bi (non-eutectic) | — | — | — | — | — | — | 90 | 90 | — |
| Sn30Bi (non-eutectic) | — | — | 90 | — | — | — | — | — | — |
| Sn40Bi (non-eutectic) | 90 | 90 | — | — | 90 | 90 | — | — | 90 |
| Sn58Bi (eutectic) | — | — | — | 90 | — | — | — | — | — |
| compression-bonding temperature reaching adhesive sheet [° C.] | 150 | 150 | 150 | 150 | 150 | 150 | 150 | 165 | 150(reflow) |
| solder wettability evaluation, chip electrode side | GOOD | GOOD | GOOD | GOOD | GOOD | GOOD | BAD | GOOD | BAD |
| solder wettability evaluation, Cu wire side | GOOD | GOOD | GOOD | BAD | GOOD | BAD | BAD | GOOD | BAD |
| bending test result evaluation | GOOD | GOOD | GOOD | BAD | BAD | BAD | BAD | BAD | BAD |
| connection reliability evaluation | GOOD | GOOD | GOOD | BAD | GOOD | BAD | BAD | BAD | BAD | to achieve excellent bending resistance. In Comparative Example 3, since neither a crystalline polyamide having a carboxyl group nor a flux compound is used, solder wettability was poor and it was not possible to achieve excellent bending resistance.

On the other hand, in Examples 1 and 2, since solder particles of a crystalline polyamide having a carboxyl group and a non-eutectic alloy are used, it was possible to achieve excellent connection reliability and bending resistance. This effect is considered to be a flux effect due to the carboxyl group present in the crystalline polyamide, and as a result, it was possible to prevent the decrease in the elastic modulus of the adhesive layer which would be caused by the addition of a flux compound and to achieve excellent bending resistance.

5. Second Examples

In the same manner as in the foregoing examples, conductive particle-containing hot-melt adhesive sheets containing solder particles were prepared, and smart cards were manufactured by using the hot-melt adhesive sheets. Then, with respect to each of the smart cards, the solder wettability, the bending test result, and the connection reliability were evaluated.

The solder particles were prepared in the same manner as in the above examples to obtain solder particles having the following composition. Further, the conductive particle-containing hot-melt adhesive sheet and the smart card were prepared, and the solder wettability, the bending test result, and the connection reliability were evaluated in the same manner as in the above-described examples.

Type 4 Sn-17 Bi (non-eutectic, solidus temperature: 157° C., liquidus temperature: 205° C.)

Type 4 Sn-30 Bi (non-eutectic, solidus temperature: 139° C., liquidus temperature: 183° C.)

Table 2 shows the blending of the conductive particle-containing hot-melt adhesive sheet of Examples 1 to 3, Comparative Examples 1 to 5, and Reference Example 1, the evaluation of the solder wettability, the evaluation of the In Comparative Example 4, it is considered that the solder particles did not melt since the thermocompression bonding temperature was lower than the solidus temperature. In Comparative Example 5, since the thermocompression bonding temperature was too high, the card surface in contact with the conductive particle-containing hot-melt adhesive sheet was melted and the position of the embedded Cu wire was lowered. For this reason, it is considered that the solder particles in the solder connection were stretched downward to cause cracking, so that it was not possible to achieve an excellent bending resistance.

In Reference Example 1, since the melt volume flow rate (MVR) of the binder was relatively low, solder particles could not be conducted by the non-weighting connection by using the reflow furnace, so that all of the evaluations of solder wettability, bending test result, and connection reliability were "BAD".

In Example 3, since solder particles of a crystalline polyamide having a carboxyl group and a non-eutectic alloy are used, it was possible to achieve excellent connection reliability and bending resistance. This effect is considered to be a flux effect due to the carboxyl group present in the crystalline polyamide, and as a result, it was possible to prevent the decrease in the elastic modulus of the adhesive layer which would be caused by the addition of a flux compound and to achieve excellent bending resistance.

REFERENCE SIGNS LIST 10 card member, 11 opening, 12 antenna pattern, 12a first exposed portion, 12b second exposed portion, 20 IC chip, 21 contact terminal

The invention claimed is:

1. A method for manufacturing a smart card, comprising the step of thermocompression bonding a card member and an IC chip with a conductive particle-containing hot-melt adhesive sheet interposed therebetween, the conductive particle-containing hot-melt adhesive sheet containing solder particles of a non-eutectic alloy in a binder containing a crystalline polyamide having a carboxyl group, wherein the solder particles have a solidus temperature of 155° C. or less.

2. The method for manufacturing a smart card according to claim 1, wherein the binder further comprises a crystalline polyester resin.

3. The method for manufacturing a smart card according to claim 2, wherein the crystalline polyamide comprises 50 to 100 wt % of the binder.

4. The method for manufacturing a smart card according to claim 2, wherein the solder particles are an alloy containing two or more metals selected from the group consisting of Sn, Bi, Ag, In, Cu, Sb, Pb, and Zn.

5. The method for manufacturing a smart card according to claim 2, wherein the content of the solder particles is 40 to 400 parts by weight per 100 parts by weight of the binder.

6. The method for manufacturing a smart card according to claim 1, wherein the crystalline polyamide comprises 50 to 100 wt % of the binder.

7. The method for manufacturing a smart card according to claim 1, wherein the solder particles are an alloy containing two or more metals selected from the group consisting of Sn, Bi, Ag, In, Cu, Sb, Pb, and Zn.

8. The method for manufacturing a smart card according to claim 1, wherein the content of the solder particles is 40 to 400 parts by weight per 100 parts by weight of the binder.

9. The method for manufacturing a smart card according to claim 1, wherein the average particle diameter of the solder particles is 70% or more of the thickness of the conductive particle-containing hot-melt adhesive sheet.

10. The method for manufacturing a smart card according to claim 1, wherein the temperature reaching the conductive particle-containing hot-melt adhesive sheet in the thermocompression bonding is 120 to 160° C.

11. The method for manufacturing a smart card according to claim 1, wherein the crystalline polyamide has a terminal carboxyl group concentration of 0.5 mgKOH/g or more.

* * * * *